Oct. 16, 1962   R. C. IRWIN   3,058,353
PROPORTIONAL LIQUID MEASURING DEVICE
Filed May 12, 1960

INVENTOR.
ROBERT C. IRWIN.
BY
ATTORNEYS.

United States Patent Office 3,058,353
Patented Oct. 16, 1962

3,058,353
PROPORTIONAL LIQUID MEASURING DEVICE
Robert C. Irwin, 1812 Norton Place, Steubenville, Ohio
Filed May 12, 1960, Ser. No. 28,708
3 Claims. (Cl. 73—428)

This invention relates to measuring devices, and is for a device for use when two liquids are to be mixed in predetermined proportion, and particularly where the mixture is to be made in a container which may be partially full of a previous mixture.

My invention has special application to the mixing of gasoline and lubricating oil in the fuel tank of an outboard marine engine, and for purpose of illustration it will be specifically described in this connection, but it is not restricted to such use and may be employed in the preparation of diverse liquid mixtures.

An outboard marine engine is commonly provided with a portable fuel tank connected with the engine through flexible tubing having quick detachable couplings with the engine. Those tanks are of standard size, being generally rectangular in shape, with a filling opening projecting from the top adapted to receive a threaded screw cap which is removed for filling the tank. The tanks now in use are standard with different engines as to capacity, shape and size. Frequently they are equipped with a depth gauge to indicate how much fuel remains in the tank.

The engines are two-cycle engines, and are lubricated by mixing oil with the fuel. Too much oil in the fuel is detrimental to engine performance, and may cause accumulations of carbon, and too little oil results in inadequate lubrication. Most manufacturers recommend one quart of oil to six gallons of fuel, and the tank is full when it contains this amount of fuel and oil.

While there is little trouble in mixing the fuel and oil in proper proportions when the tank is empty, it is often desirable to replenish the fuel and oil when the tank is only partly full, and to mix the fuel and oil directly in the fuel tank.

This invention has for its object to provide an instrumentality through which it is possible to completely fill a given vessel, which is already partly full, with a mixture of two liquids in the proper ratio to duplicate the mix already present in the vessel if that mix which is already in the vessel has been prepared according to a known formula. A specific object of the invention is to provide an instrument by which one may completely fill a tank containing a mixture of gasoline and oil with additional gasoline and oil and be sure that the ratio of gasoline to oil of the entire tank full will be in accordance with a prescribed formula.

A further object of my invention is to provide a measuring device for this or similar purposes which is simple to make and use, and inexpensive to manufacture.

My invention may be more fully explained and understood by reference to the accompanying drawings, in which.

Figure 1:
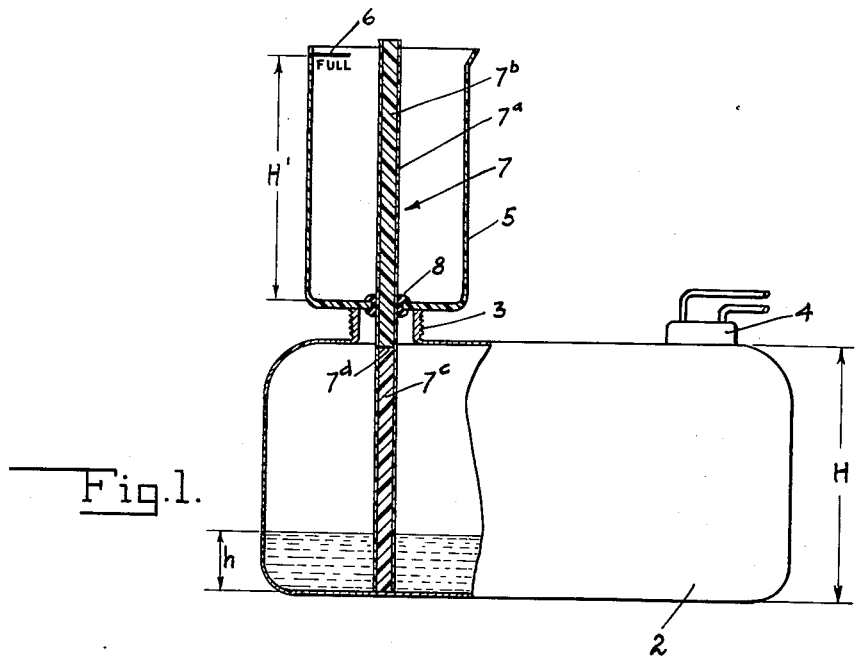
FIG. 1 is a view partly in vertical section and partly in elevation showing a device embodying my invention and a conventional outboard marine engine fuel tank with which the invention is to be used.
Figures 2, 3:
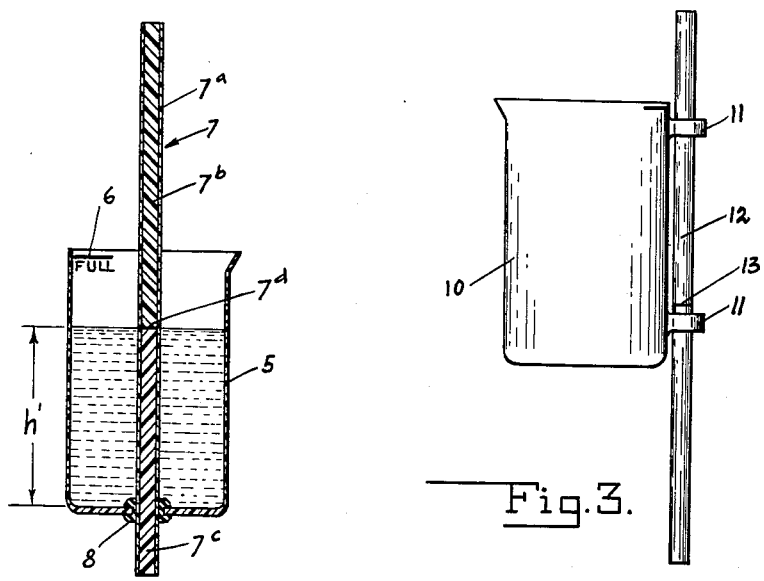
FIG. 2 is a vertical section through the measuring device showing a second step in using the device, wherein the gauge rod has been set to show how much oil is required.
FIG. 3 is a side elevation of a modified form of the invention.

Referring first to FIGS. 1 and 2, the numeral 2 designates a standard fuel tank for outboard motors having a threaded filling spout 3 from which the cap (not shown), which is normally used, has been removed. The hose connections to the engine are indicated at 4. The tank per se is now in common use, and as above indicated, six gallons of fuel and one quart of oil will fill it to capacity. The tank is approximately rectangular in longitudinal, transverse and horizontal section, although rounded at the corners. The depth of the container is indicated by the dimension H in FIG. 1.

According to the present invention there is provided a vessel or measuring cup 5. This cup has a depth H′ from the inside of the bottom to the "Full" mark or indicator 6 which is equal to H. There is a rod 7 that is long enough to extend from about the level of the top of the vessel or cup 5 to the bottom of the inside of the tank 2 when the cup is set on top of the filling spout 3, as illustrated in FIG. 1. The cup is preferably formed of transparent or translucent material as glass or plastic, a pliable plastic being preferable because of its resistance to breakage.

There is a hole in the bottom of the cup in which is set a bushing 8 of synthetic rubber or other preferably resilient or elastic material. The rod 7 is slidably fitted into the bushing, the bushing forming a liquid-tight seal about the rod and allowing the rod to be moved up and down through the bottom of the cup.

For convenience in assembly the rod here shown is comprised of a piece of clear plastic tubing $7a$ having upper and lower plastic cores $7b$ and $7c$ therein, the two core sections being of contrasting colors. The length of the lower section $7c$ is about equal to dimension H. Any other way of forming the rod so that there will be a lower portion the length of section H and an upper portion with a line of demarcation that may be easily seen, and which is smooth to move through the bushing 8 without leakage, may be substituted. However, it is preferable that the contrasting colors be in the rod itself instead of using a wooden or metal rod with applied paint, because of the more permanent nature of coloring within the body of the rod.

The diameter of the cup is such that with the rod in place, and with dimensions H and H′ being equal, the cup would hold sufficient oil if filled to mark 6 to meet the requirements of a full tank, i.e., in the example here given, one quart. Stated more generally, any unit of depth in the cup 7 is equal to the amount of one of two fluids to be formed in the mixture to be prepared in a corresponding unit of depth in the vessel to be filled.

In use, it may be assumed that the tank is partly full of a proper mixture of fuel and oil, the depth of the residue being designated "$h$," and may be any appreciable amount between full and empty. It is desired to refill the tank with a mixture in which fuel and oil are in the same ratio. The user removes the cap from the gas tank 2, sets the cup 5 on the top of filling spout 3, and pushes the rod 7 down until its lower end contacts the bottom of vessel 2 (see FIG. 1). He then removes the device, and observes the depth to which the lower end of the rod is wet. He then retracts the rod until the wet end is at the bottom of the bushing—that is, the part which projects below the bottom of the cup is equal to dimension $h$. The mark $7d$ between the two different colored sections $7b$ and $7c$ will then be a distance above the bottom of the cup equal to $H-h$ or $h'$, as shown in FIG. 2. The deeper the residue "$h$" in the tank, the less will be dimension $h'$, and vice versa.

Having made this adjustment of rod 7, the user fills the cup 5 to the level of mark $7d$ with oil and pours it into the tank 2 and then fills tank 2 with gasoline. In this way, because of the equal effective heights of 2 and 5 and the ratio of volume between 2 and 5, the proper amount of oil can be added to a tank partially full of mixture to completely fill it with a mixture of a like ratio of oil and gasoline.

Instead of having the dip stick or rod 7 pass through a bushing in the bottom of the cup, the rod may be slidably carried on the side of the cup, as shown in FIG. 3. In this figure, 10 is a cup of the depth of the container in which the mix is to be made, as in FIG. 1, and its volume is such that it will hold the maximum amount of one of the two liquids to be mixed in the mixing vessel. It is provided with guides 11 on the side thereof, and a rod 12, similar to rod 7, is slidably fitted in these guides with enough friction so that it will not slide of its own weight, or stated differently, will remain in any position to which it is moved until manually set to a different position. It has a lower portion and an upper portion with an indicator mark 13 intermediate its ends located above the lower end a distance equal to the depth of container 10.

For convenience, the vessel 5 in FIGS. 1 and 2 and the vessel 10 in FIG. 3 has a pouring lip and slight excess of height, so that the dimension referred to as the height or depth of the container or cup may be the distance from the bottom to a line indicating a "full" level, and this may also be true of the container in which the mixture is made. For example, the device may be used for mixing paints where the mix requires a ratio where one quart of color is to be mixed with say three quarts of white. The gallon bucket would not be filled to the very top, but to a "full" mark below the top. The "H" dimension is therefore the level to which the main container is to be filled, whether it be level full, or to a predetermined mark below the top to which it is to be filled. Other liquids than those specified may of course be mixed in with devices constructed according to this invention, and other ways for using the device will be apparent. For example, if the main tank is empty and an unknown quantity of gasoline is poured into it, the depth of the gasoline in the fuel tank may be measured and the indicating mark 7d on the rod may be set at a level corresponding to the indicated depth above the bottom of the cup, and the proper volume of oil to be added may then be poured into the cup by filling it to the mark 7d.

It is important that the measuring stick or rod be carried by the container so that the liquid to be measured can be brought level with the mark 7d or 13, as the case may be.

I claim:
1. For use in preparing a fuel and oil mixture in an outboard marine engine fuel tank of generally uniform section from top to bottom, an oil measure comprising a cup, the depth of which is equal to the depth of the tank and the volume of which is equal to the full amount of oil to be mixed with a tank full of fuel, a rod slidably carried by the cup for movement up and down relative thereto, means on the cup in which the rod is slidably guided and frictionally held in the position to which it is moved, the rod being of a length greater than the depth of the fuel tank and having a marking intermediate its ends spaced from the lower end of the rod at a point such that the length of rod between the lower end thereof and the mark is approximately equal to the maximum depth of fuel which the tank will hold.

2. The invention defined in claim 1 in which the cup is formed of plastic of a polyethylene-like material and the rod is slidable through a seal in the bottom of the cup, the upper portion of the rod comprising a handle for moving the rod up and down.

3. For use with a mixture-holding vessel of a specified height and volume in which liquids are to be mixed in definite proportions, the invention comprising a measuring container the depth of which from the bottom to a "full" indication is equal to the depth of said mixture-holding vessel and the volume of which equals the total volume of one of the liquids to be used in making the maximum volume of the mixture which the said first vessel will hold, and a rod carried by and affixed to the measuring container for vertical sliding movement relative thereto, the rod having a lower portion adapted to be projected into the mixture-holding vessel, said lower portion being of a length equal to the full depth of the mixture-holding vessel, the rod having an upper portion with a visible indicator at the point of juncture of the lower portion and the upper portion, the rod being slidable relative to the measuring container to enable the rod to be projected downwardly into the bottom of the vessel and then slid upwardly until only that portion of the rod wet by liquid in the vessel protrudes below the bottom of the measuring container when the indicator on the rod will be at a level above the bottom of the measuring container a distance corresponding to the total depth of the mixture-holding vessel less the depth of any liquid already in the vessel, said rod passing through the bottom of the container, the container having a liquid-tight seal in the bottom thereof in which the rod is slidably fitted, the upper portion of the rod extending to at least the level of the top of the container when the lower portion is fully projected into the mixture-holding vessel with which the device is used.

References Cited in the file of this patent

UNITED STATES PATENTS

| | | |
|---|---|---|
| 494,467 | Donathen | Mar. 28, 1893 |
| 784,708 | Stone | Mar. 14, 1905 |
| 2,712,396 | Mowat | July 5, 1955 |